United States Patent
Sasaki

(10) Patent No.: US 6,680,125 B1
(45) Date of Patent: Jan. 20, 2004

(54) COATING COMPOSITION AND METHOD FOR PREPARING THE SAME, AND SCUFF-RESISTANT PLASTIC LENSE

(75) Inventor: Kunio Sasaki, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/674,200

(22) PCT Filed: Apr. 30, 1999

(86) PCT No.: PCT/JP99/02320

§ 371 (c)(1),
(2), (4) Date: Dec. 18, 2000

(87) PCT Pub. No.: WO99/57212

PCT Pub. Date: Nov. 11, 1999

(30) Foreign Application Priority Data

May 1, 1998 (JP) .............................. 10-121945

(51) Int. Cl.$^7$ .................. B32B 27/00; B32B 5/16; B32B 9/04; B32B 3/00; C08K 5/32

(52) U.S. Cl. .................. 428/423.1; 428/220; 428/328; 428/329; 428/330; 428/331; 428/332; 428/446; 428/447; 428/448; 428/926; 524/261; 524/492; 524/430; 524/497

(58) Field of Search .................. 524/700, 783, 524/789, 847, 858, 261, 265, 590, 591, 839, 840, 492, 430, 497; 428/220, 323, 328, 329–332, 327, 339, 411.1, 412, 423.1, 446, 447, 448, 926

(56) References Cited

U.S. PATENT DOCUMENTS

| | | | | |
|---|---|---|---|---|
| 3,986,997 A | | 10/1976 | Clark | ............... 524/300 |
| 4,017,456 A | | 4/1977 | Tucker et al. | |
| 4,021,405 A | | 5/1977 | Tucker et al. | |
| 4,309,319 A | | 1/1982 | Vaughn, Jr. | ............... 106/177.1 |
| 4,374,158 A | | 2/1983 | Taniguchi et al. | ............ 427/536 |
| 4,436,851 A | | 3/1984 | Vaughn, Jr. | ............... 524/43 |
| 5,181,141 A | | 1/1993 | Sato et al. | ............... 359/580 |
| 5,292,568 A | * | 3/1994 | Tezuka et al. | ............... 428/64 |
| 5,462,806 A | * | 10/1995 | Konishi et al. | ............. 428/451 |
| 5,503,935 A | * | 4/1996 | Patel | ................ 428/412 |
| 5,830,578 A | * | 11/1998 | Ono et al. | ................ 428/446 |

FOREIGN PATENT DOCUMENTS

| | | |
|---|---|---|
| JP | 51-119039 | 10/1976 |
| JP | 61-114203 | 5/1980 |
| JP | 56-84729 | 7/1981 |
| JP | 56-116003 | 9/1981 |
| JP | 61-255937 | 11/1986 |
| JP | 63-141001 | 6/1988 |
| JP | 2-262104 | 10/1990 |
| JP | 3-109502 | 5/1991 |
| JP | 3-182573 | 8/1991 |
| JP | 3-269507 | 12/1991 |
| JP | 5-93803 | 4/1993 |
| JP | 5-215905 | 8/1993 |
| JP | 6-17005 | 1/1994 |
| JP | 7-90224 | 4/1995 |
| JP | 8-198985 | 8/1996 |
| JP | 8-311408 | 11/1996 |

* cited by examiner

*Primary Examiner*—Paul Thibodeau
*Assistant Examiner*—Sheeba Ahmed
(74) *Attorney, Agent, or Firm*—Frishauf, Holtz, Goodman & Chick, P.C.

(57) ABSTRACT

The present invention is concerned with a coating composition for a hard coat layer of a plastic lens, which comprises (A) a hydrolyzate of a specific alkoxysilane compound, (B) fine particles of an oxide of silicon, aluminum, tin, antimony, zirconium, tungsten or titanium or composite fine particles made of oxides of any two oxides of these, (C) a polyurethane and (D) a curing agent, and the coating composition is applied onto a plastic lens surface to give a scratch-resistant plastic lens.

16 Claims, No Drawings

COATING COMPOSITION AND METHOD FOR PREPARING THE SAME, AND SCUFF-RESISTANT PLASTIC LENSE

CROSS REFERENCE TO RELATED APPLICATION

This application is a U.S. national phase application under 35 U.S.C. 371 of International Application No. PCT/JP99/02320 (not published in English), filed Apr. 30, 1999.

THE INVENTION

The present invention relates to a coating composition for a hard coat layer of a plastic lens, a process for the preparation thereof, and a scratch-resistant plastic lens. More specifically, the present invention relates to a coating composition which is applied to a plastic lens surface for lending scratch resistance, etc., thereto and which is formable into a hard coat layer excellent in adhesion, a process for the preparation thereof, and a plastic lens which has a hard coat layer made of the above coating composition formed on a surface thereof and is excellent in scratch resistance, and the like.

PRIOR ART

As compared with glass lenses, plastic lenses, allyldiglycolcarbonate resin lenses in particular, are light in weight and excellent in safety, processability and cosmetics, and are coming rapidly to be popular owing to developments of an anti-reflection techniques and hard coating techniques in recent years. Further, there are under way developments of lenses made of thermoplastic resins having a smaller molding time and a smaller molding shrinkage than thermosetting resins such as an allyldiglycolcarbonate resin. Particularly, a lens made of a polycarbonate resin has come to be popular due to its excellent impact resistance.

While plastic lenses are widely used as described above, the plastic lenses have a defect that they are easily scratched or marred as compared with glass lenses.

For overcoming the above defect, it is recent practice to coat a plastic lens surface with a material having a high hardness. For example, U.S. Pat. No. 3,986,997, U.S. Pat. No. 4,309,319 and U.S. Pat. No. 4,436,851 disclose an abrasion resistant coating composition formed of a mixture of an alkoxysilane with colloidal silica. A cured coating of the above coating composition has excellent adhesion to an acrylic resin substrate. However, it does not at all adhere to some other plastic substrates, or it peels off due to a change with the passage of time even if it has excellent adhesion in the beginning.

For application to a plastic such as a polycarbonate, which is poor in adhesion to an organosiloxane-containing hard coating agent, it is general practice to use a primer. The use of the primer causes problems in productivity that a coating machine or equipment is complicated and that the step of coating takes a longer time period, so that there has been desired a direct application method that can be carried out without any treatment with a primer.

As a method of direct application to a polycarbonate without any treatment with a primer, several methods have been proposed in JP-A-7-90224, and the like. In these methods, however, dyeing which is characteristic of a plastic lens is almost impossible. Further, when a general dipping method is employed for the application, interference fringes are caused by a difference between the refractive index of a polycarbonate and that of a hard coating film, which is undesirable in view of an appearance.

SUMMARY OF THE INVENTION

It is an object of the present invention to provide a coating composition for a hard coat layer, which coating composition overcomes the above defects of the prior art and can form a scratch-resistant hard coat layer having excellent adhesion to plastic lenses such as a Polycarbonate lens without using any primer, and having transparency and excellent dyeability, by a general application method, and a method of preparation thereof. It is also an object of the present invention to provide a scratch-resistant plastic lens having a coating formed by applying the above coating composition.

For achieving the above objects, the present inventor has made diligent studies and as a result has found that a composition containing, as essential components, a hydrolyzate of an organosilicon compound having a specific structure, specific metal oxide fine particles, a polyurethane and a curing agent can give a hard coat layer which not only has sufficient adhesion, dyeability and flexibility but also has excellent scratch resistance (abrasion resistance) when applied onto a plastic lens surface and cured under heat. On the basis of the above finding, the present invention has been completed.

That is, according to the present invention, there is provided a coating composition for a hard coat layer of a plastic lens, which comprises, as essential components, (A) a hydrolyzate of an organosilicon compound of the general formula (I),

wherein $R^1$ is an alkyl group having 1 to 10 carbon atoms, an alkoxy group having 1 to 10 carbon atoms, an alkenyl group having 2 to 10 carbon atoms, an aryl group having 6 to 10 carbon atoms, an aralkyl group having 7 to 10 carbon atoms or a monovalent organic group having a mercapto group, an amino group, a methacryloxy group or an epoxy group, $R^2$ is an alkyl group having 1 to 4 carbon atoms, $R^3$ is an alkyl group having 1 to 10 carbon atoms, an alkoxyalkyl group having 2 to 10 carbon atoms or an acyl group having 2 to 10 carbon atoms, n is 0 or 1 and a plurality of $(OR^3)$s may be the same or different, (B) at least one kind of fine particles selected from fine particles of oxides of silicon, aluminum, tin, antimony, zirconium, tungsten and titanium and composite fine particles of at least two oxides of these, (C) a polyurethane and (D) a curing agent.

According to the present invention, further, there is provided a method of preparation of a coating composition for a hard coat layer of a plastic lens, which comprises mixing an organosilicon compound of the general formula (I) which is a precursor of the above component (A) with a polyurethane as the above component (C) optionally together with a solvent, hydrolyzing the organosilicon compound, thereby obtaining a homogeneous solution of a hydrolyzate of the organosilicon compound of the above general formula (I) as the above component (A) and the polyurethane as the component (C), and then adding the fine particles as the component (B) and the curing agent as the component (D).

According to the present invention, further, there is provided a scratch-resistant plastic lens having a hard coat layer formed of the above coating composition on a surface thereof.

BEST MODE FOR PRACTICING THE INVENTION

In the coating composition of the present invention, a hydrolyzate of an organosilicon compound of the general formula (I) is used as component (A).

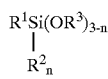

$$R^1Si(OR^3)_{3-n} \\ | \\ R^2_n \quad (I)$$

In the above general formula (I), $R^1$ is an alkyl group having 1 to 10 carbon atoms, an alkoxy group having 1 to 10 carbon atoms, an alkenyl group having 2 to 10 carbon atoms, an aryl group having 6 to 10 carbon atoms, an aralkyl group having 7 to 10 carbon atoms or a monovalent organic group having a mercapto, amino, methacryloxy or epoxy group. The above alkyl group, alkoxy group and alkenyl group may be linear, branched or cyclic. Examples of the alkyl group having 1 to 10 carbon atoms include methyl, ethyl, n-propyl, isopropyl, n-butyl, isobutyl, sec-butyl, tert-butyl, pentyl, hexyl, octyl, cyclopentyl and cyclohexyl groups. Examples of the alkenyl group having 2 to 10 carbon atoms include vinyl, allyl, propenyl, butenyl and hexenyl groups. Examples of the alkoxy group having 1 to 10 carbon atoms include methoxy, ethoxy, n-propoxy, isopropoxy, n-butoxy, isobutoxy, sec-butoxy, tert-butoxy, pentoxy, hexoxy, octoxy, cyclopentoxy and cyclohexoxy groups. Examples of the aryl group having 6 to 10 carbon atoms include phenyl, tolyl, xylyl and naphthyl groups. Examples of the aralkyl group having 7 to 10 carbon atoms include benzyl and phenetyl groups. Further, the monovalent organic group having a mercapto, amino, methacryloxy or epoxy group is preferably an alkyl group having 1 to 6 carbon atoms and having the above substituent, and specific examples thereof include γ-mercaptopropyl, γ-aminopropyl, γ-methacryloxypropyl, γ-glycidoxypropyl and 3,4-epoxycyclohexyl groups.

$R^2$ is an alkyl group having 1 to 4 carbon atoms, and the alkyl group may be linear or branched. Examples thereof include methyl, ethyl, n-propyl, isopropyl, n-butyl, isobutyl, sec-butyl and tert-butyl groups. $R^3$ is an alkyl group having 1 to 10 carbon atoms, an alkoxyalkyl group having 2 to 10 carbon atoms or an acyl group having 2 to 10 carbon atoms. The alkyl group having 1 to 10 carbon atoms includes those explained with regard to the above $R^1$. Examples of the alkoxyalkyl group having 2 to 10 carbon atoms include methoxymethyl, methoxyethyl, methoxypropyl, ethoxymethyl, ethoxyethyl and ethoxypropyl groups. Examples of the acyl group having 2 to 10 carbon atoms include acetyl, propionyl and butylyl groups. n is 0 or 1, and a plurality of $(OR^3)$s may be the same or different.

Examples of the organosilicon compound of the above general formula (I) include methyltrimethoxysilane, ethyltriethoxysilane, vinyltriethoxysilane, phenyltriethoxysilane, dimethyldimethoxysilane, phenylmethyldimethoxysilane, γ-glycidoxypropyltrimethoxysilane, γ-glycidoxypropylmethyldiethoxysilane, β-(3,4-epoxycyclohexyl)ethyltrimethoxysilane, γ-methacryloxypropyltrimethoxysilane, N-β-(aminoethyl)-γ-aminopropyltrimethoxysilane, γ-aminopropyltrimethoxysilane, γ-mercaptopropyltrimethoxysilane and orthoethylsilicate. These compounds may be used alone or in combination.

In the present invention, a hydrolyzate of the above organosilicon compound is used as component (A). The method for hydrolysis is not specially limited, and can be selected from known methods. For example, there is preferably employed a method in which the hydrolysis is carried out without any solvent or in a water-miscible organic solvent such as an alcohol in the presence of an inorganic acid such as hydrochloric acid or sulfuric acid.

In the coating composition of the present invention, as component (B), there is used at least one kind of fine particles of oxides of silicon, aluminum, tin, antimony, zirconium, tungsten and titanium and composite fine particles of at least two oxides of these. In the present specification, the latter term "composite fine particles" includes a mixture of at least two kinds of oxide fine particles selected from the former "fine particles of oxides" (for example, see JP-A-56-84729) and a product prepared by modifying a mixture of at least two kinds of oxide fine particles selected from the former "fine particles of oxides". It is advantageous to use the fine particles as component (B) in a colloidal state where the fine particles are uniformly dispersed in water or an organic solvent. Further, the fine particles preferably have an average diameter in the range of from 1 to 200 mμ, and are properly selected as required depending upon a purpose in use of the coating composition.

In the present invention, one kind of the above metal oxide fine particles may be used, or two or more kinds of the metal oxide fine particles may be used in combination.

In the coating composition of the present invention, the polyurethane as component (C) is not critical so long as it is a transparent liquid polyurethane. It can be selected from a one-part thermoplastic polyurethane, a two-part thermoplastic polyurethane and a thermosetting polyurethane. In view of weathering resistance, a non-yellowing polyurethane is preferred. Examples of the one-part thermoplastic polyurethane include a trade name "Coatron KYU-1" and a trade name "Sanprene SP-75" (both supplied by Sanyo Kasei Kogyo K. K.). Concerning the two-part thermoplastic polyurethane, the polyol component includes polyesterpolyol and acrylpolyol, and the isocyanate component includes hexamethylenediisocyanate, xylylenediisocyanate, hydrogenated xylylenediisocyanate, 4,4'-methylenebisdicyclohexyldiisocyanate and isophoronediisocyanate. Such a polyurethane can be selected from those described in JP-A-61-114203, JP-A-51-119309, JP-A-3-269507, JP-B-5-48253, JP-A-5-93803, JP-A-3-109502 and JP-B-6-79084.

Generally, a polyurethane has poor compatibility with an organic silicon compound and a metal oxide sol.

Even if a polyurethane is added in a small amount, or even if a coating composition forms a homogeneous transparent solution, a transparent coating is not easily formed when the coating is formed by curing, since fogging or phase separation is liable to take place.

The present inventor has overcome the problem of the above fogging and phase separation of the coating by mixing the organosilicon compound of the general formula (I) which is a precursor of the above component (A) with the polyurethane as the component (C) optionally together with a solvent, hydrolyzing the organosilicon compound, thereby obtaining a solution of a hydrolyzate of the organosilicon compound of the general formula (I) as component (A) and the polyurethane as component (C), and then adding the fine particles as component (B) and a curing agent as component (D) to the solution.

In the coating composition of the present invention, examples of the curing agent as component (D) include various acids, bases, metal salts of organic acids, metal alkoxides and metal chelate compounds, and the curing agent can be properly selected as required.

Examples of the above acids include an organic carboxylic acid, chromic acid, hypochlorous acid, boric acid, perchloric acid, bromic acid, selenious acid, aluminic acid and carbonic acid. Examples of the bases include amines such as allylamine, ethylamine and pyridine, sodium hydroxide and ammonium hydroxide. Examples of the metal salts of organic acids include sodium acetate and potassium formate. Examples of the metal alkoxides include alkoxides of metals such as aluminum, zirconium, titanium and magnesium.

Examples of the metal chelate compounds include aluminum acetyl acetonate.

Concerning amounts of the components of the coating composition of the present invention, the amount of the metal oxide fine particles as component (B) per 100 parts by weight of the hydrolyzate of the organosilicon compound as component (A) is generally in the range of from 1 to 200 parts by weight, preferably 10 to 100 parts by weight. When the amount of the above component (B) is less than 1 part by weight, a cured coating may have insufficient hardness. When it exceeds 200 parts by weight, gelation is caused. The amount of the polyurethane as component (C) is generally in the range of from 0.1 to 100 parts by weight, preferably 0.5 to 50 parts by weight. When the amount of the above component (C) is less than 0.1 part by weight, a cured coating may have insufficient adhesion to a substrate. When it exceeds 100 parts by weight, it is observed that the transparency of a cured coating tends to decrease. Further, the amount of the curing agent as component (D) is generally in the range of from 0.1 to 50 parts by weight, preferably 1 to 20 parts by weight. When the amount of the curing agent is less than 0.1 part by weight, curing may be insufficient. When it exceeds 50 parts by weight, gelation is caused.

The coating composition of the present invention is generally diluted with a solvent when used. The solvent is preferably a water-soluble or water-compatible organic solvent. Examples of the solvent preferably include alcohols such as methanol, ethanol, propanol, butanol, ethoxyethanol, butoxyethanol and methoxypropanol, and cellosolves such as monomethyl, monoethyl and monobutyl ethers of ethylene glycol and propylene glycol. These solvents may be used alone or in combination. The solvent is preferably selected as required by taking account of the type of the polyurethane to be used and the solvent resistance of a substrate of a plastic lens to which the coating composition is to be applied.

In addition to the above components (A) to (D), the coating composition of the present invention may contain various additives generally used in conventional coating compositions for plastic lenses, for example, a resin such as an epoxy resin, an ultraviolet absorbent, a photo-stabilizer such as a hindered-amine-containing photo-stabilizer, an antioxidant and a surfactant as required for improving the coating composition in various properties, so long as the physical properties of a cured coating are not impaired.

The plastic lens to which the coating composition of the present invention is applied is not specially limited. Examples of the plastic lens to which the coating composition of the present invention is applied include a lens made of polymethyl methacrylate, a lens made of a polycarbonate, a lens made of an aliphatic allyl carbonate, a lens made of an aromatic allyl carbonate and a lens made of a polythiourethane. Of these, it is advantageous to apply the coating composition of the present invention to a lens made of a polycarbonate such as a polycarbonate lens having poor adhesion to a general organosiloxane hard coating agent.

The scratch-resistant plastic lens of the present invention is formed of one of the above plastic lens and a hard coat layer formed of the above coating composition on the surface of the plastic lens.

The method of applying the above coating composition to the plastic lens surface is not specially limited, and it can be selected, for example, from general methods such as a dipping method, a spin coating method or a spraying method as required. In view of surface accuracy, a dipping method and a spin coating method are particularly preferred.

The coating composition applied onto the plastic lens surface is generally cured by drying with heated air or by irradiation with active energy rays. The curing is preferably carried out in hot air having a temperature of 50 to 200° C., particularly preferably carried out in hot air having a temperature of 70 to 130° C. The active energy rays include far infrared ray, etc., and in this case, thermal damage can be decreased to a lower level.

In the above manner, a hard coat layer having transparency and having excellent adhesion, dyeability and scratch resistance can be formed on the surface of a plastic lens, particularly a polycarbonate-based lens, by a general application method without using a primer. The hard coat layer has a thickness generally in the range of from 1 to 10 $\mu$m, preferably 2 to 5 $\mu$m.

Preferably, a difference between the refractive index of the hard coat layer and the refractive index of a lens substrate is adjusted, and when the refractive index difference is adjusted to approximately 0.03 or less, interference fringes caused by the refractive index difference can be prevented.

In the scratch-resistant plastic lens of the present invention, an anti-reflection film may be formed on the above hard coat layer as required. As an anti-reflection film, a known anti-reflection film, such as a single-structured anti-reflection film made of an inorganic oxide, an inorganic fluoride or an inorganic nitride or a multi-structured anti-reflection film made of these can be formed by a physical vapor deposition method (PVD method) such as a vacuum vapor deposition method, a sputtering method or an ion plating method or by a chemical vapor deposition method (CVD method).

Specific examples of components for constituting a low-refractivity layer and a high-refractivity layer of the anti-reflection film include silicon dioxide, silicon monoxide, zirconium oxide, tantalum oxide, yttrium oxide, aluminum oxide, titanium oxide, magnesium fluoride and silicon nitride (see, for example, JP-A-56-116003 and JP-A-2-262104). The anti-reflection film generally has a thickness in the range of from 0.1 to 1 $\mu$m.

The anti-reflection film formed on the hard coat layer improves the plastic lens in anti-reflection performances. Further, a water-repellent film may be formed on the above anti-reflection film (see, for example, Japanese Patent 2561395).

In the present invention, the plastic lens before the hard coat layer is applied can be dyed, or the plastic lens after the hard coat layer is formed or the hard coat layer and the anti-reflection film are formed can be dyed. The dye for the dyeing preferably includes a disperse dye and a cationic dye, and a disperse dye is particularly preferred. While dyeing conditions such as a dye concentration, a dyeing temperature and a dipping time period can be set in broad ranges, the dye concentration per liter of water is preferably 0.01 wt % to 5 wt %, the dipping time period is 10 minutes to 6 hours (preferably 20 minutes to 3 hours), and the dyeing temperature is 60° C. to 100° C. (preferably 80° C. to 90° C.), in view of light-shielding capability and reproduction of dyeing.

The present invention will be explained further in detail with reference to Examples hereinafter, while the present invention shall not be limited by these Examples.

Plastic lenses having a hard coat layer each were measured for various properties according to the following methods.

(1) Scratch Resistance

The surface of a plastic lens was rubbed with a steel wool #0000 and visually inspected for a scratch state, and the observed scratch state was evaluated on the basis of the following ratings.

A . . . Almost no large scratch is formed even a plastic lens surface is rubbed intensely.

B . . . A large scratch is formed when a plastic lens surface is rubbed intensely.

C . . . A surface comes to be opaque when a plastic lens surface is rubbed intensely.

(2) Adhesion

A lens surface was cross-cut at intervals of approximately 1 mm, a cellophane tape (trade name "Cellotape", supplied by Nichiban K. K.) was intensely attached and then rapidly peeled off, and squares formed of a remaining coating on the lens surface were counted.

(3) Dyeability

Water was added to 3 ounces (approximately 85 g) of a disperse dye (Molecular Catalytic Brown, supplied by BPI), and the disperse dye was dispersed to prepare 1 liter of a dyeing bath. A plastic lens was dyed in the dyeing bath at 90° C. for 10 minutes to evaluate the lens for dyeability.

(4) Appearance

A plastic lens was visually inspected under a fluorescent lamp in a dark room for defects on its appearance such as fogging.

(5) Refractive Index

Measured with an Abbe refratometer supplied by Atago.

EXAMPLE 1

(1) Preparation of Coating Composition

A glass container equipped with a stirrer was charged with 47 parts by weight of γ-glycidoxypropyltrimethoxysilane, 32 parts by weight of a thermoplastic polyurethane (trade name "Coatron KYU-1", resin content 40% by weight, supplied by Sanyo Kasei Kogyo K. K.), 10 parts by weight of acetic acid and 40 parts by weight of diacetone alcohol (to be abbreviated as "DAA" hereinafter). While these materials were stirred, 12 parts by weight of 0.01 N hydrochloric acid was dropwise added little by little over approximately 2 hours, and then the mixture was stirred for 24 hours to hydrolyze the γ-glycidoxypropyltrimethoxysilane. Then, 120 parts by weight of a dispersion (trade name "OSCAL 1432", supplied by Shokubai Kasei Kogyo K. K., solid content 30% by weight) of colloidal silica in isopropyl alcohol (to be abbreviated as IPA hereinafter), 10 parts by weight of acetic acid and 56 parts by weight of DAA were added, and the mixture was stirred for 2 hours. Then, 48 parts by weight of propylene glycol monomethyl ether (to be abbreviated as PGM hereinafter), 24 parts by weight of IPA, 5 parts by weight of aluminum acetyl acetone (to be abbreviated as ALAA hereinafter) and 0.3 part by weight of a silicone-based surfactant (trade name "Y-7006", supplied by Nippon Unicar K. K.) were added, and the mixture was fully stirred and then aged for 48 hours, to obtain a coating composition. The "OSCAL 1432" had an average particle diameter of 10 to 20 nm.

(2) Formation of Hard Coat Layer

A surface-cleaned polycarbonate type lens made, as a main component, of a polycarbonate having a refractive index (nd) of 1.52 was dipped in the coating composition obtained in the above (1), and the coating composition was applied to the polycarbonate lens at a lifting rate of 12 cm/minute. The applied coating composition was cured by heat-treatment at 100° C. for 2 hours, to form a 3.4 μm thick hard coat layer having a refractive index (nd) of approximately 1.50 by taking account of the refractive index of the lens substrate. Table 1 shows results of evaluation of the plastic lens provided with this hard coat layer.

EXAMPLE 2

A coating composition was prepared, and a hard coat layer was formed, in the same manner as in Example 1 except that the thermoplastic polyurethane was replaced with a mixture of 24 parts by weight of "Coatron KYU-1" with 8 parts by weight of a trade name "Sanprene SP-75" (supplied by Sanyo Kasei Kogyo K.K., resin content 30% by weight). Table 1 shows results of evaluation of the plastic lens provided with this hard coat layer.

EXAMPLE 3

(1) Preparation of Coating Composition

A glass container equipped with a stirrer was charged with 57 parts by weight of γ-glycidoxypropyltrimethoxysilane, 1.2 parts by weight of a trade name "Sanprene SP-75", 7 parts by weight of acetic acid and 40 parts by weight of DAA. While these materials were stirred, 15 parts by weight of 0.01 N hydrochloric acid was dropwise added little by little over approximately 2 hours and then the mixture was stirred for 24 hours to hydrolyze the γ-glycidoxypropyltrimethoxysilane. Then, 180 parts by weight of a dispersion of a composite sol of tin dioxide/zirconium oxide/tungsten trioxide in methanol (solid content 30% by weight) and 40 parts by weight of DAA were added, and the mixture was stirred for 2 hours. Then, 60 parts by weight of PGM, 18 parts by weight of an epoxy resin (trade name "Denacol EX-314", supplied by Nagase Kasei Kogyo K. K.), 3.6 parts by weight of ALAA and 0.3 part by weight of a trade name "Y-7006" were added, and the mixture was fully stirred and then aged for 48 hours, to obtain a coating composition. The composite sol of tin dioxide/zirconium oxide/tungsten trioxide had an average particle diameter of 40 to 50 nm.

(2) Formation of Hard Coat Layer

A surface-cleaned polycarbonate lens having a refractive index (nd) of 1.59 was dipped in the coating composition obtained in the above (1), and the coating composition was applied to the polycarbonate lens at a lifting rate of 12 cm/minute. Then, the applied coating composition was cured by heat-treatment at 120° C. for 1 hour, to form a 2.4 μm thick hard coat layer having a refractive index (nd) of approximately 1.58. Table 1 shows results of evaluation of the plastic lens provided with this hard coat layer.

Then, the plastic lens was cleaned, and $SiO_2$ was deposited on the surface thereof under a pressure of $5 \times 10^{-5}$ Torr or less until a 1.5 μm thick film was formed. $ZrO_2$ was deposited thereon until a film having a thickness of approximately λ/17 was formed, and $SiO_2$ was deposited thereon until the total thickness of these two materials came to be approximately λ/4. $ZrO_2$ was deposited thereon until a film having a thickness of approximately λ/2 was formed, and then, $SiO_2$ was deposited thereon until a film having a thickness of λ/4 was formed, to form an anti-reflection film 5.

The polycarbonate lens provided with the hard coat layer and the anti-reflection film had excellent anti-reflection performance, was excellent in both film hardness and adhesion and was an excellent lens free of interference fringes.

EXAMPLE 4

(1) Preparation of Coating Composition

A glass container equipped with a stirrer was charged with 41 parts by weight of γ-glycidoxypropyltrimethoxysilane, 22 parts by weight of tetraethylorthosilicate, 1.4 parts by weight of a trade name "Coatron KYU-1", 8 parts by weight of acetic acid and 56 parts by weight of DAA. While these materials were stirred, 18 parts by weight of 0.01 N hydrochloric acid was dropwise added little by little over approximately 2 hours and then the mixture was stirred for 24 hours to hydrolyze the γ-glycidoxypropyltrimethoxysilane and tetraethylorthosilicate. Then, 210 parts by weight of a dispersion of a composite sol of tin dioxide/zirconium oxide/tungsten trioxide in methanol (solid content 30% by weight)

and 56 parts by weight of DAA were added, and the mixture was stirred for 2 hours. Then, 70 parts by weight of PGM, 21 parts by weight of a trade name "Denacol EX-314", 4.2 parts by weight of ALAA and 0.3 part by weight of a trade name "Y-7006" were added, and the mixture was fully stirred and then aged for 48 hours, to obtain a coating composition.

(2) Formation of Hard Coat Layer

A surface-cleaned polycarbonate lens was dipped in the coating composition obtained in the above (1), and the coating composition was applied to the polycarbonate lens at a lifting rate of 12 cm/minute. Then, the applied coating composition was cured by heat-treatment at 120° C. for 1 hour, to form a 2.1 μm thick hard coat layer having a refractive index (nd) of approximately 1.58. Table 1 shows results of evaluation of the plastic lens provided with this hard coat layer.

EXAMPLE 5

(1) Preparation of Coating Composition

A glass container equipped with a stirrer was charged with 47 parts by weight of γ-glycidoxypropyltrimethoxysilane, 58 parts by weight of tetraethylorthosilicate, 4 parts by weight of a trade name "Coatron KYU-1", 19 parts by weight of acetic acid and 24 parts by weight of DAA. While these materials were stirred, 29 parts by weight of 0.01 N hydrochloric acid was dropwise added little by little over approximately 2 hours and then the mixture was stirred for 24 hours to hydrolyze the γ-glycidoxypropyltrimethoxysilane and tetraethylorthosilicate. Then, 160 parts by weight of a dispersion of a composite sol of tin dioxide/zirconium oxide/tungsten trioxide in methanol (solid content 30% by weight) and 104 parts by weight of DAA were added, and the mixture was stirred for 2 hours. Then, 64 parts by weight of PGM, 16 parts by weight of a trade name "Denacol EX-721", 4.8 parts by weight of ALAA and 0.3 part by weight of a trade name "Y-7006" were added, and the mixture was fully stirred and then aged for 48 hours, to obtain a coating composition.

(2) Formation of Hard Coat Layer

A surface-cleaned polycarbonate type lens having a refractive index (nd) of approximately 1.57 was dipped in the coating composition obtained in the above (1), and the coating composition was applied to the polycarbonate lens at a lifting rate of 12 cm/minute. Then, the applied coating composition was cured by heat-treatment at 100° C. for 2 hours, to form a 2.1 μm thick hard coat layer having a refractive index (nd) of approximately 1.57. Table 1 shows results of evaluation of the plastic lens provided with this hard coat layer.

EXAMPLE 6

The polycarbonate lens having the hard coat layer obtained in Example 3 was placed in a vapor deposition apparatus and heated up to 85° C. with discharging gas, and the discharging of gas was continued until $2 \times 10^{-5}$ Torr was reached. Vapor deposition materials were deposited by an electron beam heating method, to form an undercoat layer which was made of $SiO_2$ and had a thickness of 0.6λ, a first refractive index layer formed of a mixture layer made of $Ta_2O_5$, $ZrO_2$ and $Y_2O_3$ (nd=2.05, nλ=0.075λ) and an $SiO_2$ layer (nd=1.46, nλ=0.056λ), and a second low refractive index layer (nd,=1.46, nλ=0.25λ) formed of a mixture layer made of $Ta_2O_5$, $ZrO_2$ and $Y_2O_3$ (nd=2.05, nλ=0.46λ) and an $SiO_2$ layer, whereby an anti-reflection film was formed.

The polycarbonate lens provided with the above anti-reflection film had excellent anti-reflection performance, was excellent in both film hardness and adhesion and was an excellent lens free of interference fringes.

COMPARATIVE EXAMPLE 1

A coating composition was prepared, and a hard coat layer was formed, in the same manner as in Example 1 except that the thermoplastic polyurethane was replaced with 32 parts by weight of an epoxy resin having a trade name of "Denacol EX-314". Table 1 shows results of evaluation of the plastic lens provided with this hard coat layer.

COMPARATIVE EXAMPLE 2

A coating composition was prepared, and a hard coat layer was formed, in the same manner as in Example 3 except that no polyurethane was used. Table 1 shows results of evaluation of the plastic lens provided with this hard coat layer.

TABLE 1

|  | Scratch resistance | Adhesion | Dyeability | Appearance |
|---|---|---|---|---|
| Example 1 | A | 100/100 | Excellent | Excellent |
| Example 2 | A | 100/100 | Excellent | Excellent |
| Example 3 | A | 100/100 | Excellent | Excellent |
| Example 4 | A | 100/100 | Excellent | Excellent |
| Example 5 | A | 100/100 | Excellent | Excellent |
| CEx. 1 | A | 0/100 | Excellent | Excellent |
| CEx. 2 | A | 0/100 | Excellent | Excellent |

CEx. = Comparative Example

The coating composition for a plastic lens, provided by the present invention, can form a transparent hard coat layer excellent in adhesion, dyeability and scratch resistance on the surface of a plastic lens, particularly a polycarbonate lens which is poor in adhesion to a generally used organosiloxane-containing hard coating agent, by a general application method without using a primer.

What is claimed is:

1. A scratch-resistant plastic lens comprising a plastic lens substrate, a hard coat layer made of a coating composition on a surface of the plastic lens substrate and an anti-reflection film formed on the hard coat layer, without a primer, the coating composition comprising:

(A) a hydrolyzate of an organosilicon compound of the following formula (I):

wherein $R^1$ is an alkyl group having 1 to 10 carbon atoms, an alkoxy group having 1 to 10 carbon atoms, an alkenyl group having 2 to 10 carbon atoms, an aryl group having 6 to 10 carbon atoms, an aralkyl group having 7 to 10 carbon atoms, or a monovalent organic group having a mercapto group, an amino group, a methacryloxy group or an epoxy group, $R^2$ is an alkyl group having 1 to 4 carbon atoms, $R^3$ is an alkyl group having 1 to 10 carbon atoms, an alkoxyalkyl group having 2 to 10 carbon atoms or an acyl group having 2 to 10 carbon atoms, n is 0 or 1 and a plurality of $(OR^3)$s are the same or different, (B) particles of at least one oxide of an element selected from the group consisting of silicon, aluminum, tin, antimony, zirconium, tungsten and titanium, or composite particles of at least two oxides thereof, (C) a polyurethane and (D) a curing agent which is a metal chelate compound, the coating composition contains per 100 parts by weight of the component (A), 1 to 200 parts by weight of the component (B), 0.1 to 100 parts by weight of the component (C) and 0.1 to 50 parts by weight of the component (D), a difference in the refractive index between the hard coat layer and the plastic lens substrate being 0.03 or less.

2. The scratch-resistant plastic lens of claim 1, wherein the plastic lens substrate is a polycarbonate lens.

3. The scratch-resistant plastic lens of claim 1, wherein the organosilicon compound is at least one compound selected from the group consisting of methyltrimethoxysilane, ethyltriethoxysilane, vinyltriethoxysilane, phenyltriethoxysilane, dimethyldimethoxysilane, phenylmethyldimethoxysilane, γ-glycidoxypropyltrimethoxysilane, γ-glycidoxypropylmethyldiethoxysilane, β-(3,4-epoxycyclohexyl) ethyltrimethoxysilane, γ-methacryloxypropyltrimethoxysilane, N-β-(aminoethyl)-γ-aminopropyltrimethoxysilane, γ-aminopropyltrimethoxysilane, γ-mercaptopropyltrimethoxysilane and orthoethylsilicate.

4. The scratch-resistant plastic lens of claim 3, wherein the curing agent is aluminum acetyl acetonate.

5. The scratch-resistant plastic lens of claim 4, wherein the component (B) is in an amount of 10 to 100 parts by weight per 100 parts by weight of the component (A).

6. The scratch-resistant plastic lens of claim 5, wherein the component (C) is in an amount of 0.5 to 50 parts by weight per 100 parts by weight of the component (A).

7. The scratch-resistant plastic lens of claim 6, wherein the component (D) is in an amount of 1 to 20 parts by weight per 100 parts by weight of the component (A).

8. The scratch-resistant plastic lens of claim 7, wherein the coating composition further comprises at least one solvent selected from the group consisting of methanol, ethanol, propanol, butanol, ethoxyethanol, butoxyethanol, methoxypropanol, monomethyl ether of ethylene or propylene glycol, monoethyl ether of ethylene or propylene glycol, and monobutyl ether of ethylene or propylene glycol.

9. The scratch-resistant plastic lens of claim 8, wherein the coating composition further comprises at least one additive selected from the group consisting of an epoxy resin, an ultraviolet absorbent, a hindered-amine-containing photo-stabilizer, an antioxidant and a surfactant.

10. The scratch-resistant plastic lens of claim 1, wherein the plastic lens substrate comprises a plastic selected from the group consisting of polymethyl methacrylate, an aliphatic allyl carbonate, an aromatic allyl carbonate and a polythiourethane.

11. The scratch-resistant plastic lens of claim 1, wherein the hard coat layer has a thickness of 1 to 10 μm.

12. The scratch-resistant plastic lens of claim 1, wherein the hard coat layer has a thickness of 2 to 5 μm.

13. The scratch-resistant plastic lens of claim 1, wherein the coating composition is produced by the a process which comprises mixing an organosilicon compound of the following formula (I):

$$R^1Si(OR^3)_{3-n}$$
$$\underset{R^2_n}{|}$$
(I)

wherein $R^1$ is an alkyl group having 1 to 10 carbon atoms, an alkoxy group having 1 to 10 carbon atoms, an alkenyl group having 2 to 10 carbon atoms, an aryl group having 6 to 10 carbon atoms, an aralkyl group having 7 to 10 carbon atoms, or a monovalent organic group having a mercapto group, an amino group, a methacryloxy group or an epoxy group, $R^2$ is an alkyl group having 1 to 4 carbon atoms, $R^3$ is an alkyl group having 1 to 10 carbon atoms, an alkoxyalkyl group having 2 to 10 carbon atoms or an acyl group having 2 to 10 carbon atoms, n is 0 or 1 and a plurality of $(OR^3)$s are the same or different, with 0.1 to 100 parts by weight, per 100 parts by weight of the component (A), of a polyurethane (C), optionally together with a solvent, hydrolyzing the organosilicon compound, thereby obtaining a solution of a hydrolyzate of the organosilicon compound of the formula (I) to form the component (A) and the polyurethane of component (C), and adding 1 to 200 parts by weight, per 100 parts by weight of the component (A) of particles (B) of at least one oxide of an element selected from the group consisting of silicon, aluminum, tin, antimony, zirconium, tungsten and titanium, or composite particles of at least two oxides thereof, wherein the particles of the component (B) have an average diameter of 1 to 200 mμ, and 0.1 to 50 parts by weight per 100 parts by weight of the component (A), of a curing agent (D) which is a metal chelate compound, to the solution, a difference in the refractive index difference between the hard coat layer and the plastic lens being 0.03 or less.

14. The scratch-resistant plastic lens of claim 1, wherein (B) comprises said composite particles which comprise a composite sol of tin dioxide, zirconium oxide and tungsten trioxide.

15. The scratch-resistant plastic lens of claim 13, wherein (B) comprises said composite particles which comprise a composite sol of tin dioxide, zirconium oxide and tungsten trioxide.

16. The scratch-resistant plastic lens of claim 1, wherein the curing agent is aluminum acetyl acetonate.

* * * * *